United States Patent [19]
O'Brien et al.

[11] Patent Number: 5,203,107
[45] Date of Patent: Apr. 20, 1993

[54] FISHING LINE LIMIT ASSEMBLY

[76] Inventors: James R. O'Brien, 4355 Pilgrim Hollow Ct., Brookfield, Wis. 53005; Robert E. Luce, N169 W19820 Chestnut Ct., Apt. 11, Jackson, Wis. 53037

[21] Appl. No.: 678,112

[22] Filed: Apr. 1, 1991

[51] Int. Cl.5 ............................................. A01K 93/00
[52] U.S. Cl. ............................................. 43/44.9; 43/44.91
[58] Field of Search ................ 43/44.87, 44.92, 44.89, 43/44.91, 44.9

[56] References Cited

U.S. PATENT DOCUMENTS

| | | | |
|---|---|---|---|
| 691,407 | 1/1902 | Pacetty | 43/44.9 |
| 2,563,560 | 8/1951 | Stafford | 43/44.92 |
| 2,849,827 | 9/1958 | Gardiner | 43/44.9 |
| 2,910,798 | 11/1959 | Bias | 43/44.9 |
| 3,114,984 | 12/1963 | Atton | 43/44.9 |
| 3,196,575 | 7/1965 | Kotis | 43/44.89 |
| 3,271,893 | 9/1966 | Bowers | 43/44.9 |
| 3,733,734 | 5/1973 | Hysaw | 43/44.9 |
| 4,279,092 | 7/1981 | Hutson | 43/44.91 |
| 4,696,125 | 9/1987 | Rayburn | 43/44.9 |

Primary Examiner—Kurt Rowan
Attorney, Agent, or Firm—Godfrey & Kahn

[57] ABSTRACT

A fishing line limit (10) includes a body (12) having an outer margin (14) that is ovoid or capsule-shaped. The body (12) has a notch (16) that extends substantially radially inwardly relative to the major axis (13) of the body (12). The notch (16) receives a fishing line (30) to attach the fishing line limit (10) by frictional engagement at preselected locations along the length of the fishing line. The notch (16) has a transverse dimension which is less than the relaxed diameter of the fishing line. The outer margin (14) defines a predetermined diametral dimension that exceeds the inside diameter of an eyehole of a bobber or other object.

8 Claims, 4 Drawing Sheets

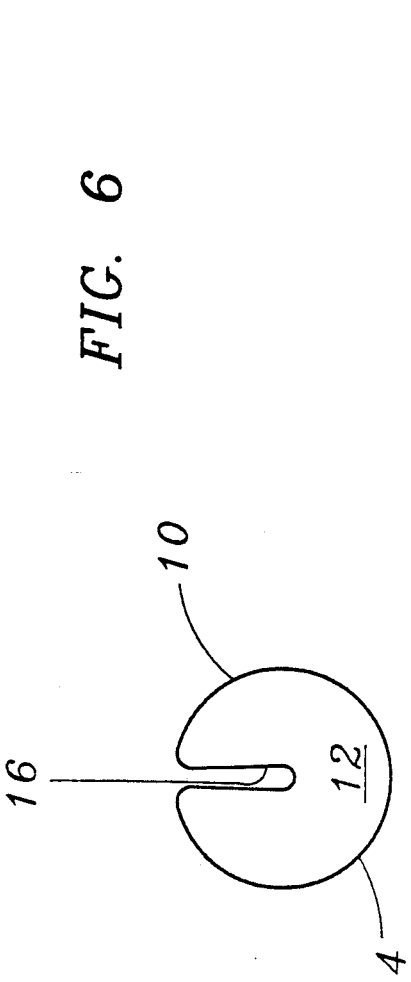
FIG. 6
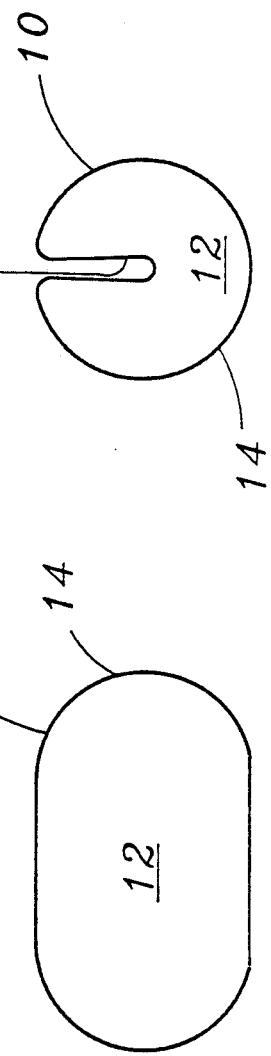
FIG. 3
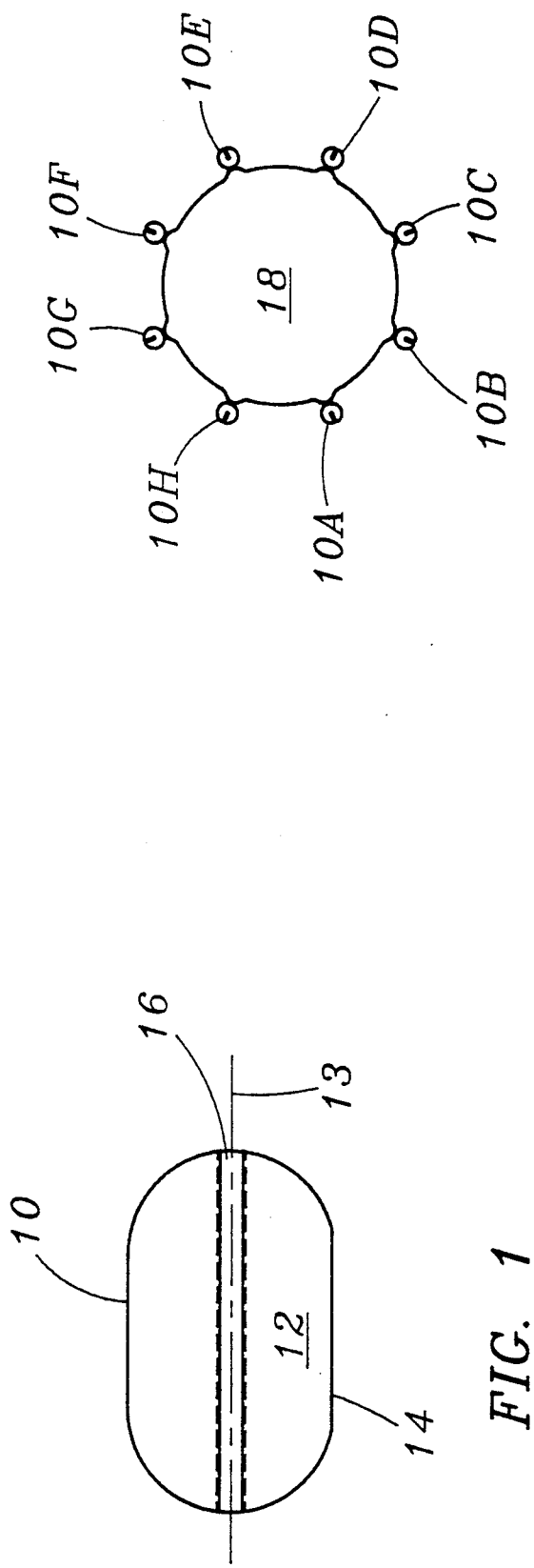
FIG. 1
FIG. 2

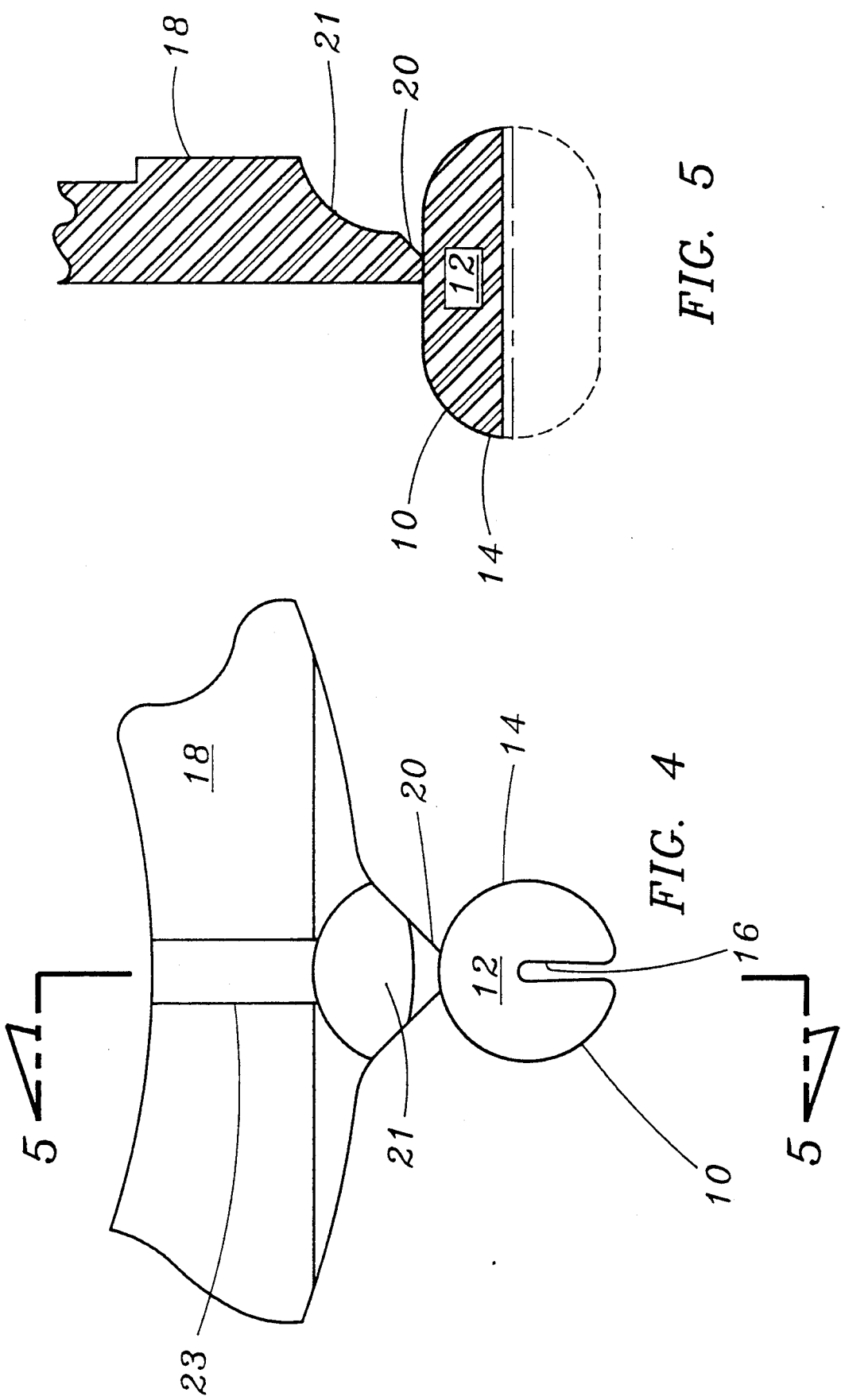

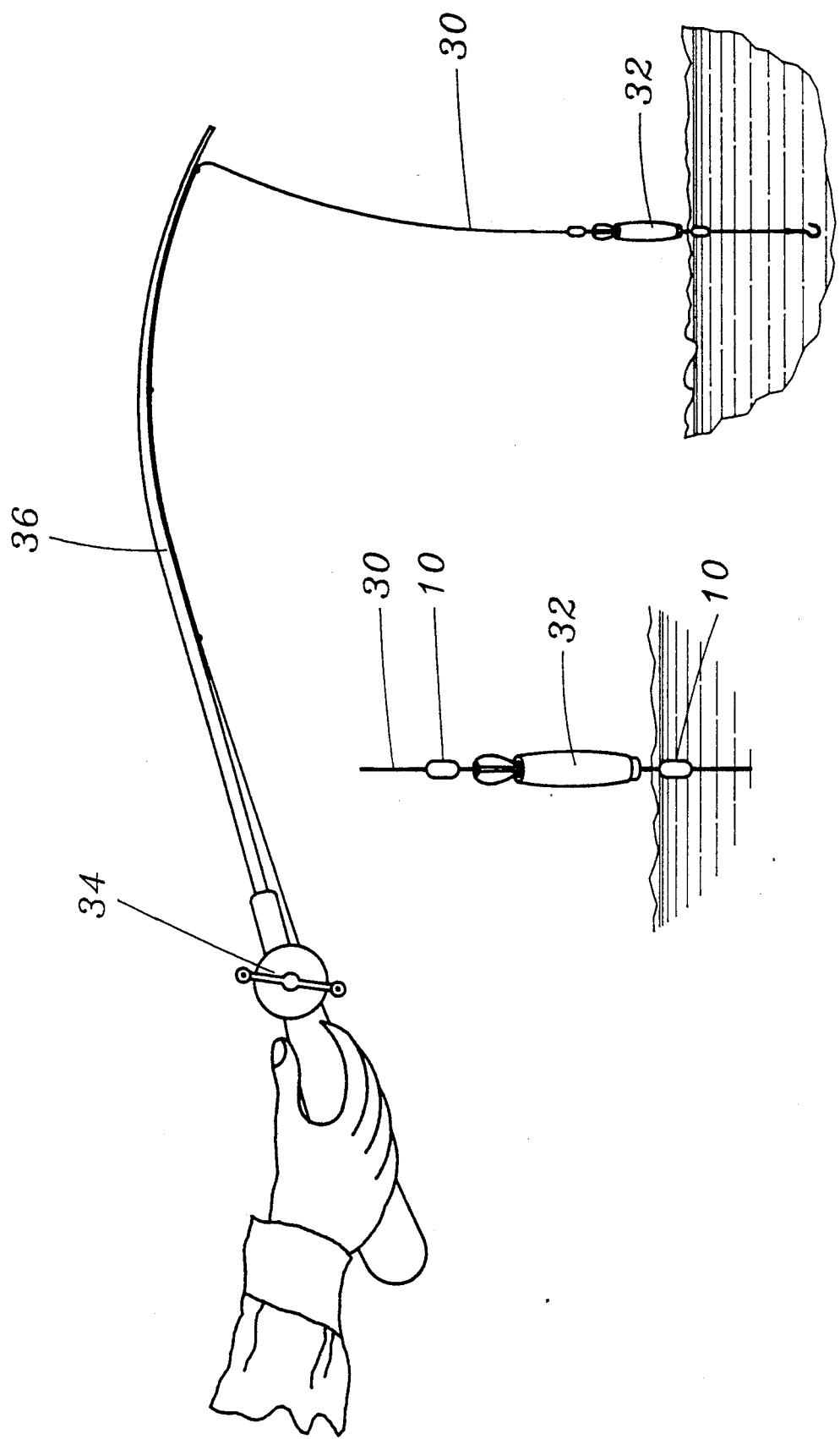

FISHING LINE LIMIT ASSEMBLY

FIELD OF THE INVENTION

The present invention relates to a fishing line limit assembly or stop used to restrain the movement of a fishing line relative to a bobber or other object of interest.

BACKGROUND OF THE INVENTION

As should be understood, bobbers are floats which are commonly used in association with sports fishing utilizing a rod and which indicate the presence of a fish strike at a submerged lure. One bobber which is commercially available, and widely used, includes a design which has a central passageway or eyehole through which the fishing line is strung, the fishing line freely passing therethrough relative to the bobber. In order to position the bobber upon the line in a desired preselected location, a bobber stop is employed to constrain movement of the bobber upon the fishing line. The bobber stop includes a bead or similar round object that is threaded or strung upon the fishing line in position adjacent the bobber, the bead having an outside dimension greater than the central passageway or eyehole of the bobber. The bobber stop further includes a means for fixing or mooring the bead to the fishing line in a desired location to constrain movement of the bobber against the bead. Various means are employed for fixing the beads in desired position to the line. One method, marketed under the brand name FIN ® Bobber Stop by Arndt & Sons, Inc. and identified as patent pending, threads the fishing line through a spiral spring that is positioned adjacent the bead, the spring being manipulable by hand such that the coils about the center section of the spring may be spread apart until those coils are snugly positioned against the fishing line. A second method, marketed under the brand name TOUCHDOWN ® Slip-N-Lock Stop by Tom Boy Lures, weaves the fishing line in and out through a member having a series of holes, such weaving engaging against the line to remain fixedly in place and the member being positioned adjacent the bead. In a third method, marketed as a Wazp brand Bobber-Sinker Stop, the fishing line is threaded through the hole of a rubber shaped donut that may be slid along the line and that elastically compresses against the line to hold position. In yet another method, the line is threaded through the hollow interior of a short glass tube that is wound about its exterior by a cord. The windings of the cord may be slid off the edge of the tube, the tube withdrawn from the fishing line, and ends of the cord are drawn tight to form a knotted arrangement that ties about the fishing line. The bead then abuts the knot formed by the cord.

As may be derived from the foregoing, the position of the bobber with respect to the length of the line may not always be readily repositioned along the length of the line by each of the foregoing methods. If it is desired to reposition the bobber relative to the line or other point of reference along the line, for example, where the depth of the line is to be adjusted, it may be necessary to rethread the bobber stop from the end of the fishing line or gently move the bobber stops along the length of the fishing line. This procedure may be time-consuming and frustrating. Further, the aforedescribed bobber stops are sized large enough such that they may foul the reel if wound within.

While the prior art has suggested various solutions to the present problem none have been widely accepted by sports fishermen due in large measure to the difficulties in implementing same and due further to the widely accepted use of certain designs of bobbers which have been commercially available for long periods of time.

Accordingly, a need has arisen for a fishing line limit or stop which may easily be attached to a fishing line at preselected locations to restrain movement of the fishing line through an eyehole of a bobber or other object and which further avoids the detriments associated with the prior art practice.

SUMMARY OF THE INVENTION

In accordance with the present invention, a fishing line limit assembly includes a body having an outer margin that is substantially ovoid or capsule-shaped. The body further has a notch formed therein that extends substantially radially inwardly and which has a transverse dimension which is less than the relaxed outside diameter of a fishing line utilized with same. In operation, the notch receives and frictionally engages the fishing line thereby attaching the fishing line limit at a preselected location along the length of the line to restrict movement of the fishing line through the inside diameter of an eyehole of a bobber or other object. The fishing line limit remains fixed at the preselected location by frictional engagement of the notch against the outside diameter of the fishing line. If at a later time it is desired, the fishing line limit may be liberated from the fishing line by manually manipulating the fishing line limit in such a fashion whereby the line limit assembly deforms thereby permitting the withdrawal of the fishing line from the notch of the fishing line limit assembly. The fishing line limit is small enough such that it may remain on the line and be wound within a reel without fouling same.

In addition to the foregoing, the present invention may be manufactured in such a fashion wherein a plurality of fishing line limits are detachably affixed to a support structure such that one such limit may be selectively detached as needed from the support structure after engagement of the notch against the outside diameter of the fishing line. The support structure is discardable after all of the line limits attached thereto have been used.

Further objects, features, and advantages of the present invention will be apparent from the following detailed description taken in combination with the accompanying drawings and attached claims.

BRIEF DESCRIPTION OF THE DRAWINGS

In the drawings:

FIG. 1 is a front elevational view of the fishing line limit assembly of the present invention.

FIG. 2 is a rear elevational view of the fishing line limit assembly of the present invention.

FIG. 3 is an end view of the fishing line limit assembly of the present invention.

FIG. 4 is a fragmentary end view of the fishing line limit assembly of the present invention and which is shown as attached to an accompanying support structure.

FIG. 5 is a partial, longitudinal vertical sectional view taken from a position along line 5—5 of FIG. 4.

FIG. 6 is an end view of a plurality of fishing line limits of the present invention and which are shown attached to an accompanying support structure.

FIG. 7 is an environmental side view of a fishing rod, fishing line, and bobber with fishing line limits being located upon the line to restrain movement of the line through the bobber.

FIG. 7A is an enlarged view of FIG. 7 in the region of the bobber and fishing line limits.

DETAILED DESCRIPTION OF THE PREFERRED EMBODIMENT

Figure 8:
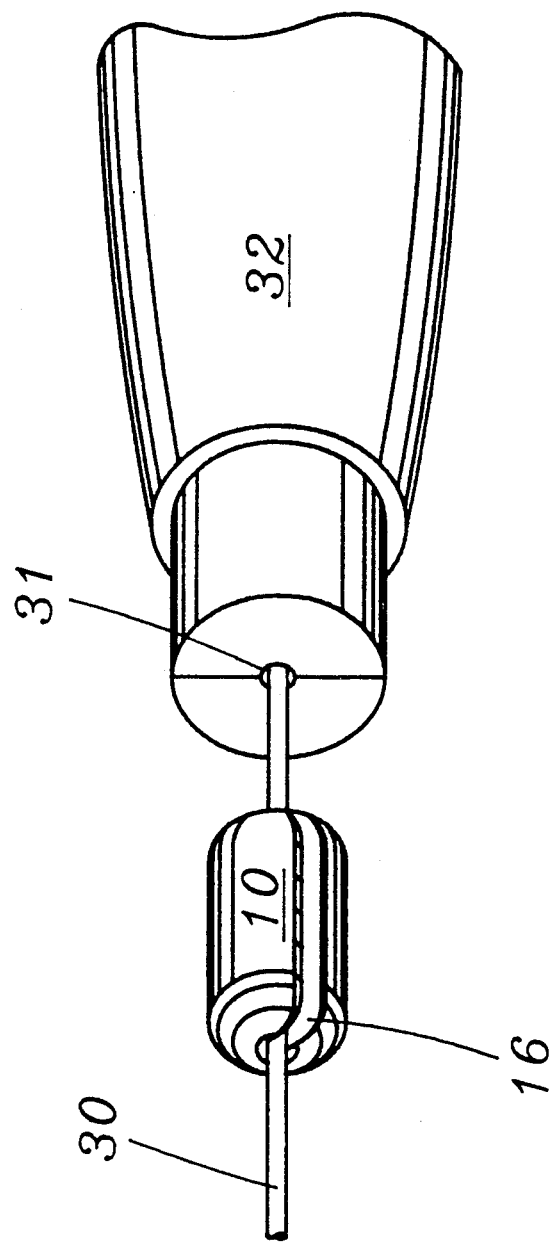
FIG. 8 is a perspective view of a fishing line limit, a fragmentary perspective view of a bobber, and a fragmentary perspective view of a fishing line extending through the eyehole of the bobber and the notch of the fishing line limit.

With reference to the drawings, a fishing line limit assembly of the present invention is generally indicated by the numeral 10 in FIGS. 1, 2, 3, 7, 7A, and 8. The fishing line limit assembly 10 includes a body 12 having an outer margin or peripheral surface 14 which is substantially ovoid or capsule-shaped, the body 12 having a major longitudinal axis 13 and a predetermined diametral dimension. The body 12 has formed therein a notch 16 that extends substantially radially inwardly with respect to the major longitudinal axis from the outer margin 14, the notch 16 being directed or extending substantially coaxially along the major longitudinal axis of the body 12 and having a transverse dimension which is less than the relaxed outside diameter of a fishing line 30 which may be utilized with same. The notch 16 extends to a depth which is slightly just greater than its radial dimension.

The notch 16 of the body 12 frictionally receives or engages the fishing line 30 thereby attaching the fishing line limit 10 at a preselected location along the length of the line 30 thereby restraining movement of the fishing line 30 through the eyehole 31 of a bobber 32 or other object. The outer margin 14 of the body 12 has a predetermined diametral dimension which is greater than the diametral dimension of the eyehole 31. Therefore, the bobber may slide up to the main body 12 but may not pass by same. The body of the present invention may be manufactured from a number of suitable synthetic polymeric based material such as polypropylene or the like.

As should be understood, the size of the fishing line limit 10 is quite small and is difficult to handle by hand, therefore, the fishing line limit 10 is preferably manufactured in a fashion wherein it is detachably affixed to a support structure 18 and which is partially depicted in FIGS. 4 and 5. The fishing line limit 10 and the support structure 18 are preferably molded from the same material as an integral piece. The fishing line limit 10 may be broken off or forcibly detached from the support structure 18 at an interconnection 20 of reduced cross-section by a manually applied twisting or other manipulation of the fishing line limit 10 with respect to the support structure 18. The support structure 18 has an indentation 21 in the region of the interconnection 20, the indentation 21 being shaped to mate with the outer margin 14 of the body 12. Upon manipulation of the body 12 and bending of the interconnection 20, the outer margin 14 of the body 12 may be received within the indentation 12 in order that the body 12 be steadied for insertion of the fishing line 30 into the notch 16 of the body 12. The support structure 18 also has a groove 23 that aligns with the notch 16 when the body 12 is received within the indentation 21, the groove 23 being sized to allow insertion of the fishing line 30 therethrough to facilitate the insertion of the fishing line 30 into the notch 16 of the body 12. As best illustrated by reference to FIG. 6, the support structure 18 preferably has attached thereto a plurality of fishing line limits 10A, 10B, 10C, 10D, 10E, 10F, 10G, and 10H, respectively. The fishing line limits 10A, 10B, 10C, 10D, 10E, 10F, 10G, and 10H are thus selectively detached from the support structure 18 as needed and the remainder are left intact for later use. As should be readily apparent, the support structure 18 has a dimension whereby it may be easily held between the thumb and index finger of the user fisherman employing same and manipulated in the fashion noted above.

The fishing line limit 10 as earlier discussed is employed to restrain movement of the fishing line 30 through the eyehole 31 of a bobber 32 or like object. The fishing line limit 10 is positioned at a preselected location proximate the bobber 32 and is attached to the fishing line by stringing or forcing the fishing line 30 at such preselected location through the notch 16. The motion of forcing the fishing line into the notch 16 has the effect of causing the body 12 to deform, thereby allowing the passage of the line 30 into the notch 16. The fishing line limit 10 then remains fixed at the preselected location by the effects of the frictional engagement of the notch 16 against the outside diameter of the fishing line 30. The fishing line limit 10 is detached from the support structure 18 in the fashion disclosed above. As depicted in FIGS. 7 and 7A, a first fishing line limit 10 is typically positioned forwardly or above of the bobber 32 and a second fishing line limit 10 is typically positioned at a preselected location rearwardly or below of the bobber 32. The bobber is thus constrained to remain at its location upon the fishing line between the fishing line limits 10 that are located forwardly and rearwardly of the bobber 32. If at a later time it is desired, the fishing line limit 10 may be liberated from the fishing line 30 by manually manipulating and applying physical force to the fishing line limit 10 to withdraw the fishing line 30 from the notch 16 of the fishing line limit 10. Further, the small size of the line limit assembly 10 is such that it may be readily received internally of the housing which encloses a spool 34 of line on a fisherman's pole 36 without fouling same. This greatly facilitates the usage of same.

It should be understood that the invention is not limited to use with a bobber as that illustrated, but may be utilized with any object having an eyehole or other passageway through which a fishing line passes and wherein movement relative to the fishing line is desired to be constrained in same fashion. It should also be understood that the support structure 18 may be configured in a number of different geometrical shapes not represented herein. It is further understood that the invention is not confined to the particular construction and arrangement of parts herein illustrated and described, but further embraces such modified forms as may come within the scope of the following claims.

What is claimed is:

1. A fishing line limit assembly that restrains movement of a fishing line through the inside diameter of an eyehole of a bobber or other object, the fishing line limit assembly comprising a body made of a polymeric-based material and having an outer margin that is sized to project from the outside diameter of the fishing line by a dimension that exceeds the dimension of the inside diameter of the eyehole and the outer margin being sized small enough to be received internally of a housing which encloses a spool of line without fouling the housing, the spool, or the line, the body having a notch that extends inward from the outer margin and that is sized to a dimension less than the relaxed outside diameter of the fishing line such that the fishing line may be inserted into the notch and the body remains fixed at the preselected location by frictional engagement of the notch against the outside diameter of the fishing line.

2. The fishing line limit assembly of claim 1 wherein the outer margin of the body is ovoid in shape.

3. The fishing line limit assembly of claim 1 wherein the body is made of polypropylene.

4. The fishing line limit assembly of claim 1 wherein the fishing line limit assembly includes a support structure to which the body is attached prior to attachment of the body to the fishing line, the body being capable of being detached from the support structure and the support structure being discardable after the body if broken off.

5. A fishing line limit assembly that restrains movement of a fishing line through the inside diameter of an eyehole of a bobber or other object, the fishing line limit assembly comprising:
  (a) a body having an outer margin that is sized to project from the outside diameter of the fishing line by a dimension that exceeds the dimension of the inside diameter of the eyehole, the body having a notch that extends inward from the outer margin and that is sized to a dimension less than the relaxed outside diameter of the fishing line such that the fishing line may be inserted into the notch and the body remains fixed at the preselected location by frictional engagement of the notch against the outside diameter of the fishing line; and
  (b) a support structure to which the body is attached prior to attachment of the body to the fishing line, the body being capable of being detached from the support structure and the support structure being discardable after the body is broken off, and wherein the body is mounted on the support structure by an interconnection and wherein the support structure has an indentation that is shaped to mate with the outer margin of the body, the body being manipulable such that the interconnection may be bent and the outer margin of the body may be received within the indentation in order that the body be steadied for insertion of the fishing line into the notch of the body.

6. The fishing line limit assembly of claim 5 wherein the support structure has a groove that aligns with the notch of the body when the body is received within the indentation, the groove being sized to allow insertion of the fishing line therethrough to facilitate the insertion of the fishing line into the notch of the body.

7. A kit for securing a bobber to a fishing line that comprises:
  (a) a bobber having an eyehole through which a fishing line is strung;
  (b) a fishing line limit assembly that includes first and second fishing line limits that attach to the fishing line, the first fishing line limit being attachable at a preselected location forward of the bobber to restrain movement of the fishing line forward of the bobber through the inside diameter of the eyehole and the second fishing line limit being attachable at a preselected location rearward of the bobber to restrain movement of the fishing line rearward of the bobber through the inside diameter of the eyehole of the bobber, each of the fishing line limits comprising a body having an outer margin that is sized to project from the outside diameter of the fishing line by a dimension that exceeds the dimension of the inside diameter of the eyehole, the fishing line limits each having a notch that extends inward from the outer margin and that is sized to a dimension less than the relaxed outside diameter of the fishing line such that the fishing line may be inserted into the notch and the respective fishing line limit remains fixed at its preselected location by frictional engagement of the notch against the outside diameter of the fishing line; and
  (c) a support structure to which the bodies are attached prior to attachment of the bodies to a fishing line, the bodies being capable of being detached from the support structure and the support structure being discardable after the bodies are broken off, and wherein the main bodies of the fishing line limits are each mounted on the support structure by an interconnection and wherein the support structure has an indentation corresponding to each one of the bodies, the indentations each being shaped to mate with the outer margin of one of the bodies, the bodies each being manipulable such that the interconnection may be bent and the outer margins of the bodies may be individually received within one of the indentations in order that the fishing line limit be steadied for insertion of the fishing line into the notch of the body.

8. The kit of claim 7 wherein the support structure has grooves that align with the notches of the bodies when the bodies are received within the respective indentation, the grooves being sized to allow insertion of the fishing line therethrough to facilitate the insertion of the fishing line into the notches of the bodies.

* * * * *